No. 777,466. PATENTED DEC. 13, 1904.
W. J. YEOMAN.
STOVEPIPE CLEANER.
APPLICATION FILED FEB. 2, 1904.
NO MODEL.
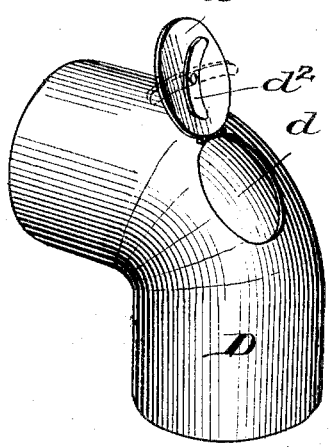
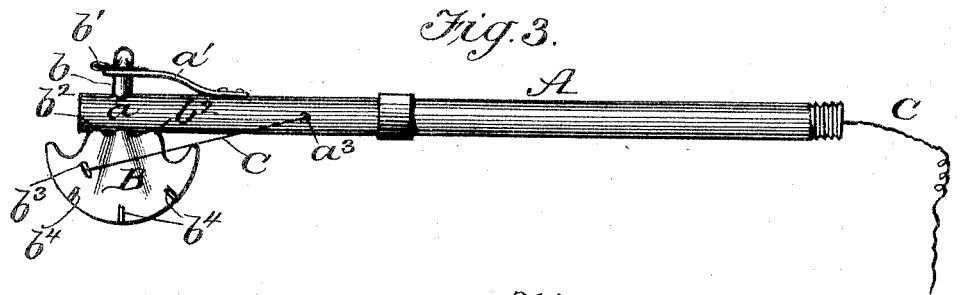
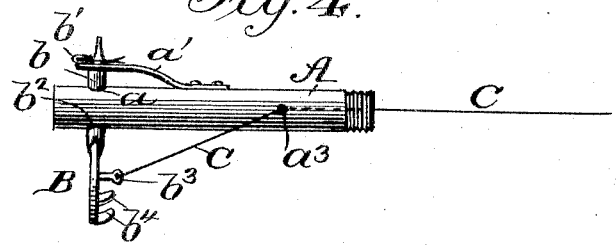
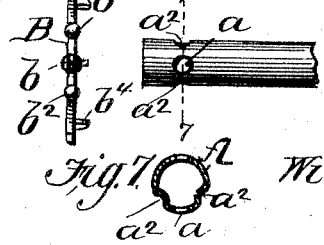
WITNESSES:
Jos. A. Ryan
Amos W. Hart
INVENTOR
William J. Yeoman
BY Munn & Co.
ATTORNEYS No. 777,466. Patented December 13, 1904.

UNITED STATES PATENT OFFICE.

WILLIAM JAMES YEOMAN, OF MANKATO, KANSAS.

STOVEPIPE-CLEANER.

SPECIFICATION forming part of Letters Patent No. 777,466, dated December 13, 1904.

Application filed February 2, 1904. Serial No. 191,769. (No model.)

*To all whom it may concern:*

Be it known that I, WILLIAM JAMES YEOMAN, a citizen of the United States, and a resident of Mankato, in the county of Jewell and State of Kansas, have made certain new and useful Improvements in Stovepipe-Cleaners, of which the following is a specification.

The object of my invention is to provide an improved means or device for cleaning stovepipes and chimney-flues, the same being so constructed that it is adapted to be conveniently inserted in and removed from the pipe or flue, as will be hereinafter described.

The chief feature of the invention is a scraper consisting of a metal blade which is so attached to a handle that it may be adjusted in the same plane therewith, or at right angles thereto, as required for inserting it in the stovepipe and for effective work therein.

The details of construction, arrangement, and operation of the device are as hereinafter described, and illustrated in the accompanying drawings, in which—

Figure 1 is a perspective view of a stovepipe-elbow having an opening and a cover or closer therefor whereby the pipe is adapted for use of my improved cleaner. Fig. 2 is a detail view of the fastening for the cover of the stovepipe-hole. Fig. 3 is a side view of my improved stovepipe-cleaner, the scraping-blade being adjusted in the same plane with the handle. Fig. 4 is a side view showing the scraping-blade adjusted at right angles to the handle. Fig. 5 is a top edge view of the scraper. Fig. 6 is a plan view of the under side of a portion of the handle. Fig. 7 is a cross-section on the line 7 7 of Fig. 6.

My improved stovepipe-cleaner is composed of a handle A and a scraping-blade B, together with certain appurtenances or attachments, as hereinafter described. The handle is hollow and preferably constructed of metal and in sections which are connected by a screw-joint. Thus the handle is adapted to be extended or contracted as required for convenience of use in longer or shorter pipes. The metal blade B is approximately semicircular in form, so that its working edge is adapted to the contour of a pipe. It is provided with a round shank $b$, which passes through a hole $a$ (see Fig. 6) in the handle and extends above the same, as shown in Figs. 3 and 4. A plate-spring $a'$ is attached adjacently to the handle, and the shank $b$ passes through a hole in its free end. A spring-pin $b'$ is inserted through the shank $b$ above the spring, as shown in Figs. 3, 4. The under side of the handle is provided with two sockets $a^2$, arranged laterally from the opening $a$ for the purpose of receiving projections or knobs $b^2$, which are formed on the upper edge of the scraper B. The said sockets $a^2$ may be formed by depressions in the metal handle, as illustrated in Fig. 7. A cord or wire C passes through the handle A and out through a lateral opening $a^3$, provided in the section to which the plate B is attached, and is secured to an eyebolt $b^3$, which forms a permanent attachment of the blade or scraper B and is located at a point laterally removed from the center thereof. It will now be apparent that if the blade B be parallel to the plane of the handle A, as shown in Fig. 3, it may be adjusted—*i. e.*, rotated a quarter around—by pulling the cord C and that upon reaching the position indicated in Fig. 4—that is to say, at right angles to the handle—the knobs or projections $b^2$ will become engaged or locked with the sockets $a^2$ of the handle by reason of the action of the spring $a'$, which tends to draw the blade upward. When the blade is thus locked in the position shown in Fig. 4, the implement is ready for use.

In Fig. 1 I illustrate a pipe-elbow D provided with an opening $d$ on the outside at the center of the bend. The said opening is closed by a cover $d'$, having a device $d^2$ attached, which serves to fasten it tightly. The said device is a curved bar having a thumb-piece which projects on the outer side of the cover, as will be readily understood. When the scraping-blade B is adjusted as in Fig. 3, the implement may be readily inserted in or withdrawn from the hole $d$ in the stovepipe, and when inserted by pulling the cord C the blade is thrown to the position indicated in Fig. 4 or at right angles to the handle and pipe. The handle is then drawn toward the opening, with the result that the pipe is scraped and the soot accumulated therein is removed. It is apparent that the implement may be used either in the horizontal or vertical section of the stovepipe.

In order to enable the blade B to pass readily over the joints of the pipe, I provide it with curved fingers $d^4$, that project on the side of the blade which is toward the operator when the implement is in use.

What I claim is—

1. The combination, with a handle having a transverse opening and sockets located laterally therefrom, of a scraper having a pivotal shank working in said opening and lateral projections adapted to engage the sockets, and a spring tending to hold the blade engaged with the handle, substantially as described.

2. The combination, with a handle having a pivotal opening and lateral sockets, of a scraping-blade having a shank by which it is pivoted, lateral projections adapted to enter the sockets when the blade is adjusted to a right angle to the handle, and a spring interposed between the handle and the outer end of the blade-shank, substantially as described.

3. The combination, with the handle constructed of metal and having a pivot socket or bearing in one end and depressions formed laterally from said bearing, of the scraping-blade having a shaft adapted to rotate in said bearing and projections adapted to engage the depressions, and a spring applied to the shaft on the side opposite the blade, whereby it is adapted to hold the blade locked when adjusted at right angles to the handle.

4. The combination, with a hollow handle, a scraping-blade having a shank which is journaled in one end of said handle and arranged transverse to the latter, and a spring applied to the shank of the blade, of a wire attached to the blade at a point removed from the center of rotation and passing through the hollow handle, substantially as and for the purpose specified.

In testimony whereof I have signed my name to this specification in the presence of two subscribing witnesses.

WILLIAM JAMES YEOMAN.

Witnesses:
JOSEPH H. WOOLLEN,
ALBERTA WHITEHEAD.